(12) United States Patent
Huang et al.

(10) Patent No.: US 11,068,719 B2
(45) Date of Patent: Jul. 20, 2021

(54) METHOD AND APPARATUS FOR SAMPLING TRAINING DATA AND COMPUTER SERVER

(71) Applicant: BEIJING TUSEN WEILAI TECHNOLOGY CO., LTD., Beijing (CN)

(72) Inventors: Zehao Huang, Beijing (CN); Naiyan Wang, Beijing (CN)

(73) Assignee: TuSimple, Inc., San Diego, CA (US)

( * ) Notice: Subject to any disclaimer, the term of this patent is extended or adjusted under 35 U.S.C. 154(b) by 6 days.

(21) Appl. No.: 16/421,320

(22) Filed: May 23, 2019

(65) Prior Publication Data
US 2019/0384982 A1    Dec. 19, 2019

(30) Foreign Application Priority Data

May 23, 2018 (CN) .......................... 201810498800.9

(51) Int. Cl.
*G06K 9/00* (2006.01)
*G06K 9/62* (2006.01)
*G06N 3/08* (2006.01)

(52) U.S. Cl.
CPC ....... *G06K 9/00718* (2013.01); *G06K 9/6259* (2013.01); *G06N 3/08* (2013.01); *G06K 2209/21* (2013.01)

(58) Field of Classification Search
CPC ..... G06K 9/6259; G06K 9/00718; G06N 3/08
See application file for complete search history.

(56) References Cited

U.S. PATENT DOCUMENTS

2010/0128927 A1* 5/2010 Ikenoue ............. G06K 9/00261
                                                            382/103
2011/0293136 A1   12/2011 Porikli
2015/0220853 A1    8/2015 Marcheret
(Continued)

FOREIGN PATENT DOCUMENTS

CN    103324937 A    9/2013
CN    104866472 A    8/2015
(Continued)

OTHER PUBLICATIONS

CNIPA First Office Action, Chinese Patent Application No. 201810498800.9, dated May 8, 2020.
(Continued)

*Primary Examiner* — John J Lee
(74) *Attorney, Agent, or Firm* — Paul Liu; Julie J. Muyco; Perkins Coie, LLP

(57) ABSTRACT

The present disclosure provides a method and an apparatus for sampling training data and a computer server. The method includes: inputting a video to a target detection model to obtain a detection result for each frame of image; inputting the detection results for all frames of images in the video to a target tracking model, to obtain a tracking result for each frame of image; and for each frame of image in the video: matching the detection result and the tracking result for the frame of image, and when the detection result and the tracking result for the frame of image are inconsistent with each other, determining the frame of image as a sample image to be marked, for which processing by the target detection model is not optimal.

20 Claims, 2 Drawing Sheets

(56) References Cited

U.S. PATENT DOCUMENTS

2016/0300573 A1* 10/2016 Carbune ............... G06F 40/174
2019/0139231 A1*  5/2019 Aizawa .............. G06K 9/00791
2019/0213739 A1*  7/2019 Ohba ................... G06K 9/4604

FOREIGN PATENT DOCUMENTS

| CN | 106707293 A | 5/2017 |
| CN | 107491790 A | 12/2017 |
| CN | 107679455 A | 2/2018 |

OTHER PUBLICATIONS

No Author. Chinese Application No. 201810498800.9, First Search Report, dated Apr. 29, pp. 1-2.

* cited by examiner

METHOD AND APPARATUS FOR SAMPLING TRAINING DATA AND COMPUTER SERVER

CROSS-REFERENCE TO RELATED APPLICATIONS

This patent document claims priority to and benefits of Chinese Application Number 201810498800.9 of the same title and content that was filed on May 23, 2018. The entire contents of the aforementioned patent application are incorporated by reference as part of the disclosure of this patent document.

TECHNICAL FIELD

The present disclosure relates to deep learning technology, and more particularly, to a method for sampling training data, an apparatus for sampling training data and a computer server.

BACKGROUND

In recent years, deep neural networks have achieved tremendous success in many fields including computer vision, natural language processing, etc. However, a deep neural network needs to meet the following three conditions in order to be applied in actual applications: 1) it meets speed requirements of the actual applications; 2) it is trained over a large amount of actual scenario data; and 3) it can be updated iteratively and quickly depending on actual requirements.

When a neural network is applied in practice, when a researcher or developer finds that processing of a video by a neural network is not optimal, he/she may need to sample some images from the video as images to be annotated, annotate the images to be annotated, add the annotated images to a training set and retrain the neural network based on the training set, so as to improve the performance of the neural network.

SUMMARY

According to some embodiments of the present disclosure, a method for sampling training data is provided. The method includes: inputting a video to a target detection model to obtain a detection result for each frame of image; inputting the detection results for all frames of images in the video to a target tracking model, to obtain a tracking result for each frame of image; and for each frame of image in the video: matching the detection result and the tracking result for the frame of image, and when the detection result and the tracking result for the frame of image are inconsistent with each other, determining the frame of image as a sample image to be annotated, for which processing by the target detection model is not optimal.

According to some embodiments of the present disclosure, an apparatus for sampling training data is provided. The apparatus includes: a target detecting unit configured to input a video to a target detection model to obtain a detection result for each frame of image; a target tracking unit configured to input the detection results for all frames of images in the video to a target tracking model, to obtain a tracking result for each frame of image; and a determining unit configured to, for each frame of image in the video: match the detection result and the tracking result for the frame of image, and when the detection result and the tracking result for the frame of image are inconsistent with each other, determine the frame of image as a sample image to be annotated, for which processing by the target detection model is not optimal.

According to some embodiments of the present disclosure, a computer server is provided. The computer server includes a memory and one or more processors communicatively connected to the memory. The memory stores instructions executable by the one or more processors. The instructions, when executed by the one or more processors, cause the one or more processors to perform the method for sampling training data according to the above first aspect.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In the related art, the images can be sampled from the video as the images to be annotated typically by sampling the image using a simple temporal interval sampling method to obtain the images to be annotated. However, the images sampled in this way may be images that have been processed well by the neural network, and thus the performance of the neural network may not be improved effectively by retraining the neural network based on these images. Hence, how to sample images whereby the neural network may be effectively improved has become a problem to be solved by those skilled in the art.

In view of the above problem, the present disclosure provides a method and an apparatus for sampling training data and a computer server, capable of sampling images for which processing by a target detection model is not optimal from a video as images to be annotated, such that the performance of the target detection model may be effectively improved by retraining the target detection model based on the images to be annotated.

Embodiment 1

Figure 1:
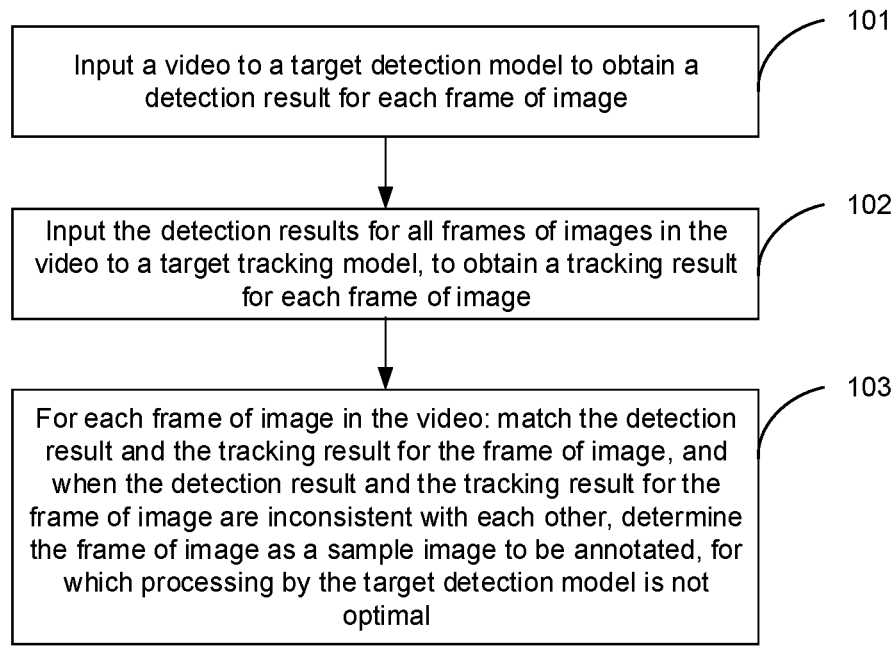
FIG. 1 is a first flowchart illustrating a method for sampling training data according to some embodiments of the present disclosure.

Referring to FIG. 1, which is a flowchart illustrating a method for sampling training data according to some embodiments of the present disclosure, the method includes the following steps.

At step 101, a video is inputted to a target detection model to obtain a detection result for each frame of image.

At step 102, the detection results for all frames of images in the video are inputted to a target tracking model to obtain a tracking result for each frame of image.

At step 103, for each frame of image in the video, the detection result and the tracking result for the frame of image are matched, and when the detection result and the tracking result for the frame of image are inconsistent with each other, the frame of image is determined as a sample image to be annotated, for which processing by the target detection model is not optimal.

In some embodiments, the above step 103 of matching the detection result and the tracking result for each frame of image may be, but not limited to be, implemented by matching the detection result and the tracking result for the frame of image by using a bipartite graph matching algorithm. The bipartite graph matching algorithm may be e.g., Hungarian matching algorithm.

Alternatively, it can be appreciated by those skilled in the art that, for each frame of image, each detection target and each tracking target may be matched in a traversal manner. For example, when a detection result of a certain frame of image includes two detection targets, A1 and A2, and the tracking result of the frame of image includes two tracking targets, B1 and B2, four pairs, A1 and B1, A1 and B2, A2 and B1, and A2 and B2, may be matched respectively. If the detection result and tracking result in each pair match each other, it is determined that the frame of image is not a sample image to be annotated, for which processing by the target detection model is not optimal; otherwise the frame of image is determined as a sample image to be annotated, for which processing by the target detection model is not optimal.

Figure 2:
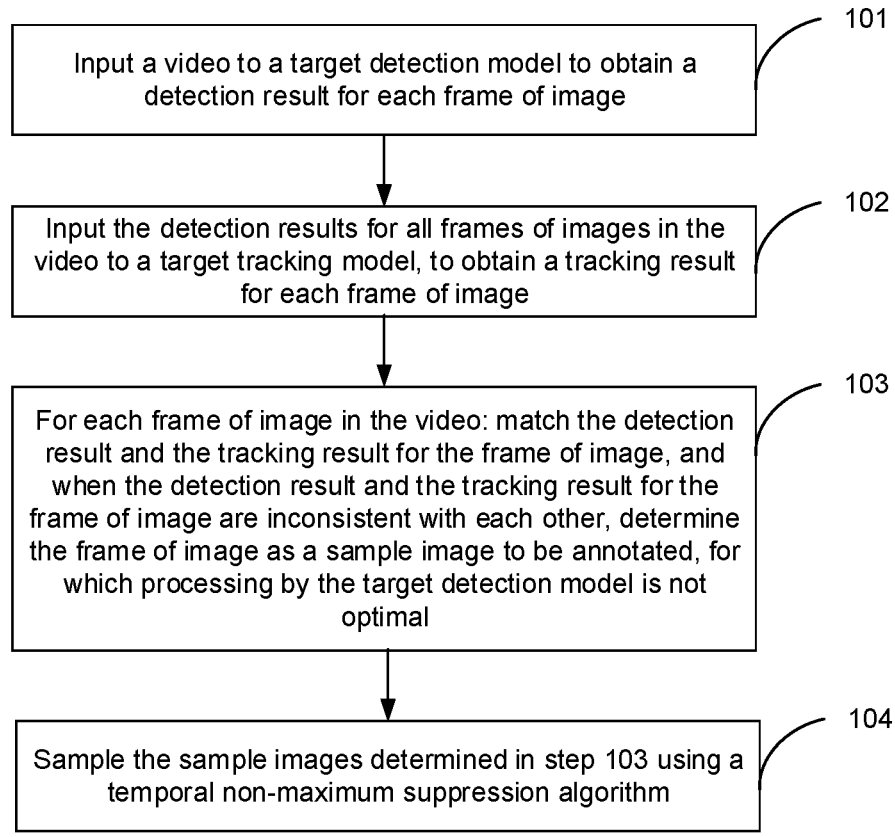
FIG. 2 is a second flowchart illustrating a method for sampling training data according to some embodiments of the present disclosure.

In some embodiments, the sample images determined in the step 103 may contain a plurality of neighboring frames of images which are substantially the same. In order to avoid redundancy and reduce the annotating workload, in some embodiments of the present disclosure, the method according to each of the above embodiments may further include step 104 after the matching for all the frames of images in the video has completed in the above step 103, as shown in FIG. 2.

At step 104, the sample images determined in the step 103 are sampled by using a temporal non-maximum suppression algorithm.

For example, it is assumed that the frames of images in the video are represented as t1, t2, t3, . . . , tn in chronological order, ten sample images are obtained in the step 103, which are t1, t2, t6, t7, t8, t20, t21, t22, t50 and t100, respectively. When the non-maximum value is set to 3, sample images in three successive frames will be sampled to obtain one frame, i.e., the ten sample images may be sampled to obtain: t1, t7, t21, t50 and t100.

It can be appreciated by those skilled in the art that other schemes, e.g., a simple interval sampling algorithm, can be used to sample the sample images in the step 104.

With the embodiments of the present disclosure, for each frame of image in a video, a detection result and a tracking result for the frame of image are matched, and when the detection result and the tracking result for the frame of image are inconsistent with each other, the frame of image is determined as a sample image to be annotated, for which processing by the target detection model is not optimal. In this way, each sample image as determined is an image for which processing by the target detection model is not optimal. A tracking result for a frame of image is typically obtained from a detection result for a previous frame of image. When the detection result and the tracking result for a frame of image are different from each other, the target detection model may have some problems such as missed detection or false detection. Typically, images for which processing by the target detection model is not optimal may better reflect defects of the target detection model. Therefore, the performance of the target detection model may be further improved by annotating the images for which processing by the target detection model is not optimal and retraining the target detection model based on the annotated images.

Embodiment 2

Figure 3:
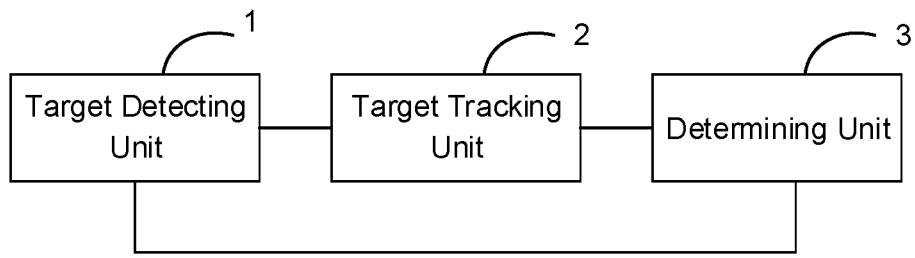
FIG. 3 is a first schematic diagram showing a structure of an apparatus for sampling training data according to some embodiments of the present disclosure.

Based on the same concept as the method for sampling training data according to the above Embodiment 1, in Embodiment 2 of the present disclosure, an apparatus for sampling training data is also provided. The apparatus has a structure shown in FIG. 3 and includes:

a target detecting unit 1 configured to input a video to a target detection model to obtain a detection result for each frame of image;

a target tracking unit 2 configured to input the detection results for all frames of images in the video to a target tracking model, to obtain a tracking result for each frame of image; and a determining unit 3 configured to, for each frame of image in the video: match the detection result and the tracking result for the frame of image, and when the detection result and the tracking result for the frame of image are inconsistent with each other, determine the frame of image as a sample image to be annotated, for which processing by the target detection model is not optimal.

In some embodiments, the determining unit 3 being configured to match the detection result and the tracking result for the frame of image may include the determining unit 3 being configured to: match the detection result and the tracking result for the frame of image by using a bipartite graph matching algorithm.

In some embodiments, the bipartite graph matching algorithm may be Hungarian matching algorithm.

Figure 4:
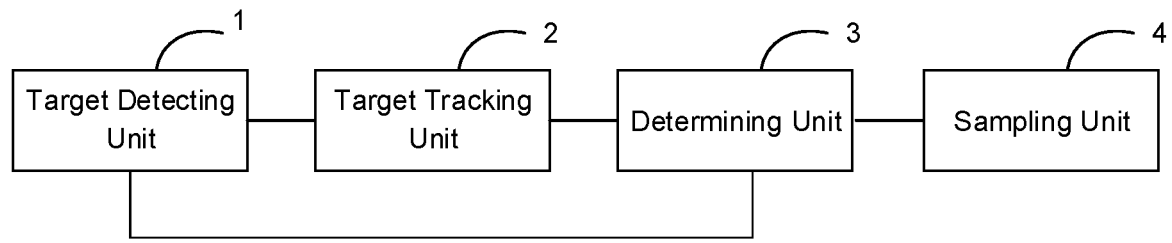
FIG. 4 is a second schematic diagram showing a structure of an apparatus for sampling training data according to some embodiments of the present disclosure.

Further, the apparatus according to the above embodiments may include a sampling unit 4, as shown in FIG. 4. The determining unit 3 may be further configured to trigger the sampling unit 4 after the matching for all the frames of images in the video has completed. The sampling unit 4 may be configured to sample the sample images determined by the determining unit by using a temporal non-maximum suppression algorithm.

With the embodiments of the present disclosure, for each frame of image in a video, a detection result and a tracking result for the frame of image are matched, and when the detection result and the tracking result for the frame of image are inconsistent with each other, the frame of image is determined as a sample image to be annotated, for which processing by the target detection model is not optimal. In this way, each sample image as determined is an image for which processing by the target detection model is not optimal. A tracking result for a frame of image is typically obtained from a detection result for a previous frame of image. When the detection result and the tracking result for a frame of image are different from each other, the target detection model may have some problems such as missed detection or false detection. Typically, images for which processing by the target detection model is not optimal may better reflect defects of the target detection model. Therefore, the performance of the target detection model may be further improved by annotating the images for which processing by the target detection model is not optimal and retraining the target detection model based on the annotated images.

Embodiment 3

Figure 5:
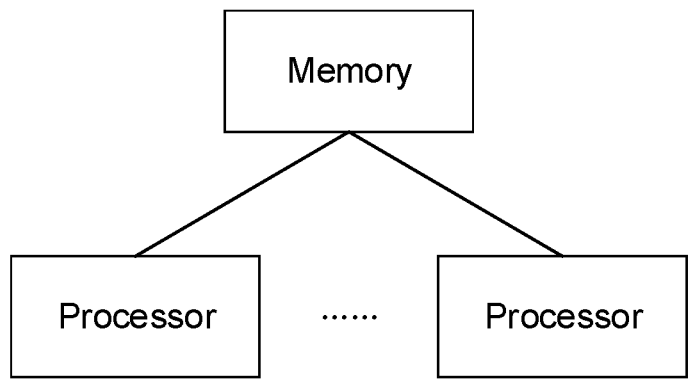
FIG. 5 is a schematic diagram showing a structure of a computer server according to some embodiments of the present disclosure.

According to Embodiment 3 of the present disclosure, a computer server is provided. As shown in FIG. 5, the computer server includes a memory and one or more processors communicatively connected to the memory.

The memory stores instructions executable by the one or more processors. The instructions, when executed by the one or more processors, cause the one or more processors to perform any method for sampling training data according to the above Embodiment 1.

In Embodiment 3 of the present disclosure, the computer server may be a hardware device such as a Personal Computer (PC), a notebook computer, a tablet, a Field Programmable Gate Array (FPGA), an industrial computer or a smart phone.

With the embodiments of the present disclosure, for each frame of image in a video, a detection result and a tracking result for the frame of image are matched, and when the detection result and the tracking result for the frame of image are inconsistent with each other, the frame of image is determined as a sample image to be annotated, for which processing by the target detection model is not optimal. In this way, each sample image as determined is an image for which processing by the target detection model is not optimal. A tracking result for a frame of image is typically obtained from a detection result for a previous frame of image. When the detection result and the tracking result for a frame of image are different from each other, the target detection model may have some problems such as missed detection or false detection. Typically, images for which processing by the target detection model is not optimal may better reflect defects of the target detection model. Therefore, the performance of the target detection model may be further improved by annotating the images for which processing by the target detection model is not optimal and retraining the target detection model based on the annotated images.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for sampling training data, comprising:
   inputting a video to a target detection model to obtain a detection result for each frame of image;
   inputting the detection results for all frames of images in the video to a target tracking model, to obtain a tracking result for each frame of image;
   for each frame of image in the video:
      matching the detection result and the tracking result for the frame of image, and when the detection result and the tracking result for the frame of image are inconsistent with each other, determining the frame of image as a sample image to be annotated, for which processing by the target detection model is not optimal; and
   sampling the determined sample images using a temporal non-maximum suppression algorithm after the matching for all the frames of images in the video has completed.

2. The method of claim 1, wherein said matching the detection result and the tracking result for the frame of image comprises:
   matching the detection result and the tracking result for the frame of image by using a bipartite graph matching algorithm.

3. The method of claim 2, wherein the bipartite graph matching algorithm comprises Hungarian matching algorithm.

4. The method of claim 1, wherein the frames of images in the video are in a chronological order.

5. The method of claim 1, wherein the tracking result for a frame of image is obtained from a detection result for a previous frame of image.

6. The method of claim 1, wherein, the temporal non-maximum suppression algorithm uses a non-maximum value N, where N is an integer, and wherein the sampling the determined sample images includes obtaining a frame from N successive frames.

7. The method of claim 1, further comprising retraining the target detection model.

8. An apparatus for sampling training data, comprising:
   a target detecting unit configured to input a video to a target detection model to obtain a detection result for each frame of image;
   a target tracking unit configured to input the detection results for all frames of images in the video to a target tracking model, to obtain a tracking result for each frame of image;
   a determining unit configured to, for each frame of image in the video:
      match the detection result and the tracking result for the frame of image, and when the detection result and the tracking result for the frame of image are inconsistent with each other, determine the frame of image as a sample image to be annotated, for which processing by the target detection model is not optimal; and
   a sampling unit,
   wherein the determining unit is further configured to trigger the sampling unit after the matching for all the frames of images in the video has completed, and the sampling unit is configured to sample the sample images determined by the determining unit by using a temporal non-maximum suppression algorithm.

9. The apparatus of claim 8, wherein the determining unit being configured to match the detection result and the tracking result for the frame of image comprises the determining unit being configured to:
   match the detection result and the tracking result for the frame of image by using a bipartite graph matching algorithm.

10. The apparatus of claim 9, wherein the bipartite graph matching algorithm comprises Hungarian matching algorithm.

11. The apparatus of claim 8, wherein the frames of images in the video are in a chronological order.

12. The apparatus of claim 8, wherein the tracking result for a frame of image is obtained from a detection result for a previous frame of image.

13. The apparatus of claim 8, wherein, the temporal non-maximum suppression algorithm uses a non-maximum value N, where N is an integer, and wherein the sampling the determined sample images includes obtaining a frame from N successive frames.

14. A computer server, comprising a memory and one or more processors communicatively connected to the memory, the memory storing instructions executable by the one or more processors, the instructions, when executed by the one or more processors, causing the one or more processors to perform a method, comprising:
   inputting a video to a target detection model to obtain a detection result for each frame of image;
   inputting the detection results for all frames of images in the video to a target tracking model, to obtain a tracking result for each frame of image;
   for each frame of image in the video:
      matching the detection result and the tracking result for the frame of image, and when the detection result and the tracking result for the frame of image are inconsistent with each other, determining the frame of image as a sample image to be annotated, for which processing by the target detection model is not optimal; and
   sampling the determined sample images using a temporal non-maximum suppression algorithm after the matching for all the frames of images in the video has completed.

15. The computer server of claim 14, wherein said matching the detection result and the tracking result for the frame of image comprises:
   matching the detection result and the tracking result for the frame of image by using a bipartite graph matching algorithm.

16. The computer server of claim 15, wherein the bipartite graph matching algorithm comprises Hungarian matching algorithm.

17. The computer server of claim 14, wherein the frames of images in the video are in a chronological order.

18. The computer server of claim 14, wherein the tracking result for a frame of image is obtained from a detection result for a previous frame of image.

19. The computer server of claim 14, wherein the temporal non-maximum suppression algorithm uses a non-maximum value N, where N is an integer, and wherein the sampling the determined sample images includes obtaining a frame from N successive frames.

20. The computer server of claim 14, wherein the method comprises retraining the target detection model.

* * * * *

UNITED STATES PATENT AND TRADEMARK OFFICE
CERTIFICATE OF CORRECTION

| | | |
|---|---|---|
| PATENT NO. | : 11,068,719 B2 | |
| APPLICATION NO. | : 16/421320 | |
| DATED | : July 20, 2021 | |
| INVENTOR(S) | : Zehao Huang and Naiyan Wang | |

It is certified that error appears in the above-identified patent and that said Letters Patent is hereby corrected as shown below:

In the Specification

In Column 6, Lines 57-58, delete "have described" and insert -- have been described --, therefor.

In the Claims

In Column 7, Line 37, in Claim 6, delete "wherein, the" and insert -- wherein the --, therefor.

In Column 8, Line 17, in Claim 13, delete "wherein, the" and insert -- wherein the --, therefor.

Signed and Sealed this
Seventh Day of November, 2023

Katherine Kelly Vidal
*Director of the United States Patent and Trademark Office*